US012770332B2

(12) United States Patent
Moroney

(10) Patent No.: US 12,770,332 B2
(45) Date of Patent: Oct. 20, 2026

(54) THREE-DIMENSIONAL OBJECT REPRESENTATIONS BASED ON SURFACE POINT IDENTIFICATIONS

(71) Applicant: Peridot Print LLC, Palo Alto, CA (US)

(72) Inventor: Nathan Moroney, Palo Alto, CA (US)

(73) Assignee: PERIDOT PRINT LLC, Palo Alto, CA (US)

( * ) Notice: Subject to any disclaimer, the term of this patent is extended or adjusted under 35 U.S.C. 154(b) by 365 days.

(21) Appl. No.: 18/039,180

(22) PCT Filed: Nov. 30, 2020

(86) PCT No.: PCT/US2020/062575
§ 371 (c)(1),
(2) Date: May 26, 2023

(87) PCT Pub. No.: WO2022/115110
PCT Pub. Date: Jun. 2, 2022

(65) Prior Publication Data

US 2024/0005606 A1 Jan. 4, 2024

(51) Int. Cl.

*G06T 17/20* (2006.01)
*G06T 7/12* (2017.01)
*G06T 7/187* (2017.01)
*G06T 7/73* (2017.01)
*G06T 19/20* (2011.01)

(52) U.S. Cl.

CPC .............. *G06T 17/205* (2013.01); *G06T 7/12* (2017.01); *G06T 7/187* (2017.01); *G06T 7/73* (2017.01); *G06T 19/20* (2013.01); *G06T 2219/2016* (2013.01)

(58) Field of Classification Search
None
See application file for complete search history.

(56) References Cited

U.S. PATENT DOCUMENTS 5,214,752 A * 5/1993 Meshkat ................. G06T 17/20 345/423
5,448,687 A * 9/1995 Hoogerhyde ........... G06T 19/00 345/423
5,682,491 A * 10/1997 Pechanek ............ G06F 9/30145 712/E9.035
5,886,702 A * 3/1999 Migdal ................... G06T 17/20 345/423

(Continued)

OTHER PUBLICATIONS

Tao et al., Mandoline: Robust Cut-Cell Generation for Arbitrary Triangle Meshes, ACM Trans. Graph., vol. 38, No. 6, Article 179. Publication date: Nov. 2019 (17 pages).

(Continued)

*Primary Examiner* — Jason A Pringle-Parker
(74) *Attorney, Agent, or Firm* — Michael Dryja

(57) ABSTRACT

In some examples, a system receives a first representation of a three-dimensional (3D) object that has a surface, and identifies points on the surface, where identifying a first point includes defining a region extending in a plurality of different directions from a second point across the surface until a criterion is satisfied, and where a location of the first point is based on a perimeter of the region. The system generates, for image output, a second representation based on the identified points.

20 Claims, 5 Drawing Sheets

(56) References Cited

U.S. PATENT DOCUMENTS

| | | | | |
|---|---|---|---|---|
| 6,806,874 | B2 | 10/2004 | Biermann et al. | |
| 6,828,966 | B1 * | 12/2004 | Gavriliu | G06T 17/20 345/420 |
| 6,968,299 | B1 * | 11/2005 | Bernardini | G06F 17/175 345/475 |
| 7,023,432 | B2 | 4/2006 | Fletcher et al. | |
| 7,133,044 | B2 | 11/2006 | Maillot et al. | |
| 7,586,488 | B2 | 9/2009 | Sander et al. | |
| 8,217,939 | B1 * | 7/2012 | Bonciu | G06T 17/00 345/611 |
| 8,970,590 | B1 * | 3/2015 | Brennan | G06T 17/20 345/581 |
| 10,360,726 | B2 * | 7/2019 | Suresh | G06T 7/13 |
| 11,574,444 | B1 * | 2/2023 | Gueth | G06T 17/10 |
| 2005/0151734 | A1 | 7/2005 | Gubkin et al. | |
| 2006/0290695 | A1 * | 12/2006 | Salomie | G06T 17/20 345/423 |
| 2008/0036765 | A1 * | 2/2008 | Hariya | G06T 17/20 345/423 |
| 2010/0134498 | A1 * | 6/2010 | Pirzadeh | G06T 17/20 345/441 |
| 2019/0147649 | A1 * | 5/2019 | Brochu | G06T 19/20 345/420 |
| 2020/0327729 | A1 | 10/2020 | Seibold | |

OTHER PUBLICATIONS

Wikipedia, CGAL last edited on Nov. 18, 2020 (3 pages).
Wikipedia, Voronoi diagram last edited on Oct. 21, 2020 (17 pages).
Wikipedia, Voxel last edited on Nov. 8, 2020 (11 pages).

* cited by examiner

THREE-DIMENSIONAL OBJECT REPRESENTATIONS BASED ON SURFACE POINT IDENTIFICATIONS

BACKGROUND

A three-dimensional (3D) object can be represented using a digital representation. For example, a Computer Aided Design (CAD) tool can be used to produce a digital representation of the 3D object. In some examples, the digital representation can be in the form of a 3D mesh, which includes an arrangement of triangles that represent respective portions of the 3D object.

BRIEF DESCRIPTION OF THE DRAWINGS

Some implementations of the present disclosure are described with respect to the following figures.

Figure 1:
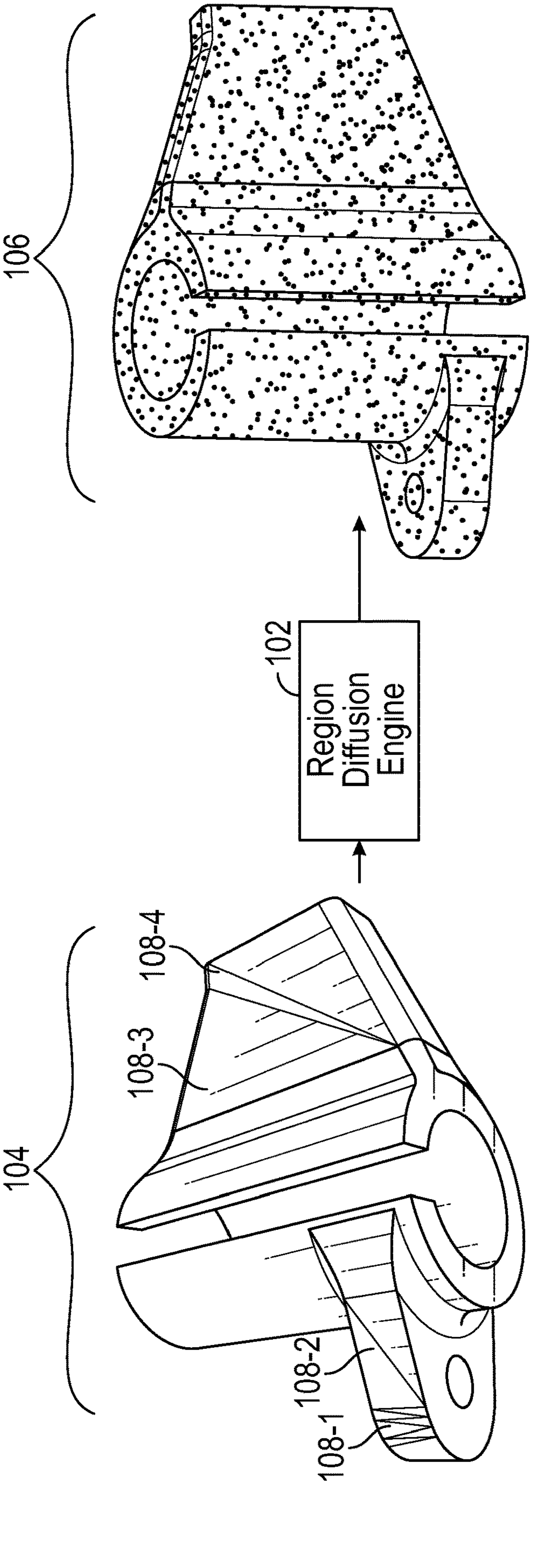
FIG. 1 is a block diagram of an arrangement including a region diffusion engine to produce a pattern of points based on an input representation of a three-dimensional (3D) object, in accordance with some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A 3D mesh produced by a CAD tool to represent a 3D object can include triangles of various different sizes. For example, smaller triangles can be used to represent portions of the 3D object with high detail, such as portions of the surface of the 3D object with curves and/or smaller features. On the other hand, larger triangles can be used to represent more uniform portions of the surface of the 3D object, such as generally flat regions of the surface of the 3D object.

In some cases, it may be desirable to manipulate portions of a digital representation of a 3D object when producing an output of the 3D object. In some examples, producing the output of a 3D object can include building the 3D object using an additive manufacturing machine, such as a 3D printer. An additive manufacturing machine builds a 3D object on a layer-by-layer basis. Successive layers of build material are formed on a build platform of the additive manufacturing machine, and each layer of build material is subjected to processing, which can involve an application of a liquid agent and heating of respective portions of the layer.

In other examples, producing an output of a 3D object can refer to displaying the 3D object on a display device of a computer.

In examples of where a digital representation of a 3D object includes a 3D mesh of triangles of different sizes, it may be difficult to manipulate certain portions of the 3D mesh, particularly those portions with a lower density of triangles. For example, a transformation of a portion of the digital report representation of the 3D object can involve bending a portion of the 3D object, displacing a portion of the 3D object, and so forth.

In accordance with some implementations of the present disclosure, a system (e.g., a computer, an additive manufacturing machine, or any other type of processing system) receives a first representation of a 3D object that has an external surface, and performs point sampling to identify points on the surface. Regions are grown from each of the identified points. After a first point is identified and a first region is grown from the first point, a second point is identified at a location along a perimeter of the first region, and a second region is grown from the second point. Each subsequent point is identified at a location along a perimeter of the latest grown region, followed by growing a region from the subsequent point. The successive identifications of points and corresponding growth of regions are re-iterated until the entire external surface is covered by the regions. Once the foregoing processing ends, a pattern of points on the external surface of the 3D object is created. This pattern of points can be used to generate a second representation of the 3D object that differs from the first representation of the 3D object. The second representation of the 3D object can be used for image output, such as a display of the 3D object in a display device or a building of the 3D object by an additive manufacturing machine.

A "representation" of a 3D object refers to a digital representation that contains information representing different parts of the 3D object.

In some examples, the first representation of the 3D object is a first 3D mesh that may include an arrangement of triangles of irregular sizes. As a result of the processing according to some implementations of the present disclosure, the second representation of the 3D object can be a second 3D mesh that includes an arrangement of triangles that are more uniform (e.g., the sizes and aspect ratios of the triangles are more uniform). In some examples, because the second 3D mesh has an arrangement of more uniform triangles, the second 3D mesh is approximately isometric.

Although reference is made to 3D meshes in which a 3D object is tessellated into triangles, more generally, a 3D mesh can be a representation of a 3D object that has been tessellated into polygons. Note that a triangle is a specific example of a polygon.

FIG. 1 illustrates an example in which a region diffusion engine 102 processes a first representation 104 of a 3D object to produce a pattern 106 of points from which a second representation of the 3D object is created. Each point is represented as a dot in the pattern 106 of points.

As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

In some examples, the first representation 104 of the 3D object is a 3D mesh in which the object is tessellated into triangles representing different portions of the external surface of the 3D object. A few triangles 108-1, 108-2, 108-3, and 108-4 are labeled in FIG. 1. Note that there are a large number of other triangles in the first representation 104. As is apparent in FIG. 1, the triangles 108-1, 108-2, 108-3, and 108-4 have different sizes. For example, the triangle 108-3 is much larger than the triangle 108-1.

A larger triangle (e.g., 108-3) is used to represent a generally flat portion of the external surface of the 3D object. Smaller triangles (e.g., 108-1 or 108-4) are used to represent portions of the external surface of the 3D object with greater detail, such as portions with curves or other structures.

The points in the pattern 106 (which can also be referred to as a "point cloud") are arranged on the external surface of the 3D object. To create the second representation of the 3D object (e.g., a second 3D mesh), triangulation is applied based on the pattern 106 of points. The triangulation forms triangles by connecting edges between the points in the pattern 106.

In some examples, each point in the pattern 106 is approximately equidistant to neighboring points. As a result, the triangles defined by connecting edges between the points in the pattern 106 are more uniform in size and aspect ratio, as compared to the widely varying triangles of the first representation 104 of the 3D object.

The points that are identified on the external surface of the 3D object by the region diffusion engine 102 conform to curves (e.g., surface concavities and convexities) and other irregular shapes on the external surface of the 3D object.

The quantity of points identified on the external surface in the pattern 106 depends upon the sampling density of the region diffusion process performed by the region diffusion engine 102. A higher (finer) sampling density results in a larger quantity of points, such that a finer 3D mesh can be formed as compared to a coarser 3D mesh formed using a lower (coarser) sampling density that results in a smaller quantity of points being identified by the region diffusion engine 102. A finer 3D mesh includes smaller triangles (or other polygons), while a coarser 3D mesh includes larger triangles (or other polygons).

It is noted that the processing time does not depend upon the sampling density. In accordance with some implementations of the present disclosure, the processing time can be constant, with finer point sampling taking the same amount of time as coarser point sampling (explained further below).

Although FIG. 1 refers to an example where the first representation of the 3D object and the second representation of the 3D object are both 3D meshes, it is noted that in other examples, other types of representations of a 3D object can be employed.

Figure 2:
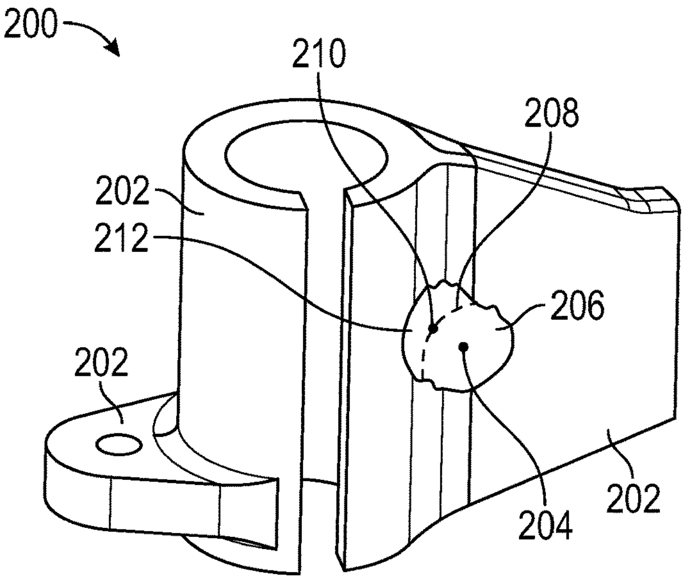
FIG. 2 is a perspective view of a representation of a 3D object having an external surface on which regions are grown, according to some examples.
Figure 3:
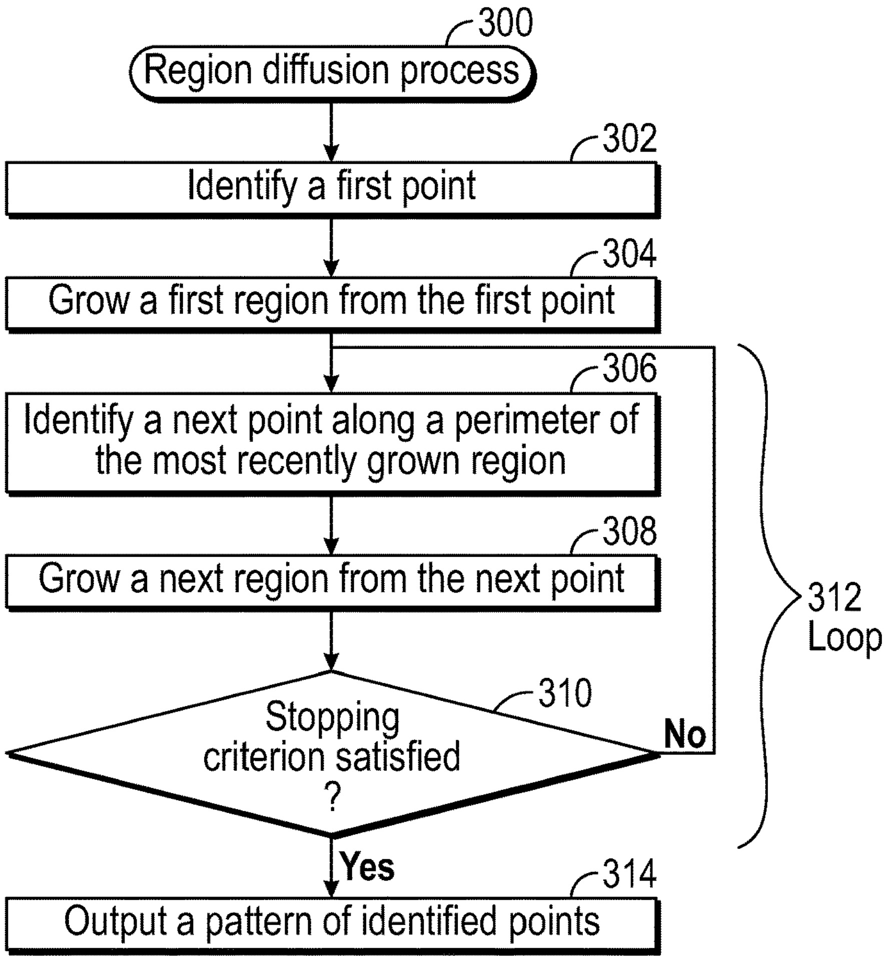
FIG. 3 is a flow diagram of a region diffusion process according to some examples.

Referring to FIGS. 2 and 3, a region diffusion processing 300 performed by the region diffusion engine 102 is explained in further detail. Generally, the region diffusion processing 300 involves growing respective regions from points identified on an external surface 202 of a 3D object 200. Initially, the region diffusion processing 300 identifies (at 302) a first point 204 at a random location along the external surface 202 of the 3D object. The first point 204 can thus be at any location, selected randomly, on the external surface 202. In other examples, the first point 204 can be selected according to a different criterion, such as at a location on the external surface 202 selected by a user, a program, or a machine, or based on another criterion. Once the first point 204 is identified, the region diffusion processing 300 grows (at 304) a region 206 in multiple different directions from the point 204. In some examples, the region 206 that is grown is generally disc-shaped, such that the point 204 is generally at the center of the disc and a perimeter 208 of the disc 206 grows radially outwardly from the point 204.

The amount of growth away from the point 204 is dependent upon the number of iterations performed in growing the region 206. Although reference is made to growing a region using a defined number of iterations, in other examples, a region is grown until a criterion is satisfied, where the criterion can be based on a size of the region, a radius of the region, or another criterion.

The number of iterations performed is dependent upon a sampling density that is used. A finer sampling density (which results in a larger quantity of points identified on the external surface 202) would mean that a smaller number of iterations is performed in growing each region. On the other hand, if a coarser sampling density is used, which results in a smaller quantity of points identified on the external surface 202, then the number of iterations performed in growing each region is reduced.

Each region on the external surface 202 is grown from a respective point in a number (1 or greater than 1) of iterations. In each iteration of the number of iterations, the region is grown by an incremental amount (e.g., based on adding neighboring voxels to the region in the iteration). A voxel is a volume element associated with a coordinate that defines a point in 3D space. The size of a voxel is a specified parameter that can be set during processing, such as based on a 3D print resolution. In general, the larger the number of voxels used, the denser point samplings that can be achieved according to some examples of the present disclosure. In some examples, a representation including voxels can be derived using a voxelization technique, such as discussed further below in connection with FIG. 4.

Since the sampling density and the number of iterations performed in growing each region are inversely proportional to each other, the processing time involved in the region diffusion processing 300 can remain constant even if a finer point sampling is selected, since selecting the finer point sampling leads to reducing the number of iterations performed in growing each region.

The ability to maintain processing time constant regardless of the sampling density allows for more robust operations associated with converting a first representation of a 3D object to a second representation of the 3D object using the region diffusion process, since increasing sampling density would not cause increased processing time that may result in delays or computer crashes in some cases.

Once the growing of the region 206 is completed (e.g., the number of iterations has been performed), the region diffusion processing 300 identifies (at 306) a next point 210 from which a next region 212 is to be grown (at 308). The location of the point 210 for the next region 212 is along the perimeter 208 of the first region 206. The location of the point 210 along the perimeter 208 can be a randomly selected location along the perimeter 208 of the first region 206.

More generally, a next point is identified at a location along a perimeter of the most recently grown region in the region diffusion process 300.

The region diffusion processing 300 continues to successively identify (in a loop 312) subsequent points (on respective perimeters of previously grown regions), and to grow regions from the subsequent points, until a stopping criterion is satisfied (as determined at 310). For example, the stopping criterion is satisfied if the entire external surface 202 of the 3D object is covered by the regions grown from the identified points.

The region diffusion process 300 produces regions that crawl along the external surface 202 of the 3D object 200, where the regions conform to the geometry (which can be complex) of the external surface 202.

Once the entire surface 202 of the external surface 202 has been covered by the regions grown by the region diffusion process 300, a pattern of identified points (e.g., 106 in FIG. 1) is output (at 314) by the region diffusion process 300. Triangulation can be applied on the pattern of identified points to form triangles that make up a 3D mesh that is different from an input 3D mesh on which the region diffusion process 300 is applied.

In accordance with some implementations of the present disclosure, growing a region from an identified point can be according to a growth template, such as according to Table 1 below.

TABLE 1

| | | |
|---|---|---|
| C | 1 | C |
| 1 | X | 1 |
| C | 1 | C |

The growth template includes an "X" that represents an extent of a current region ("current region extent") that is being grown. Initially, "X" represents the point from which the region is to be grown, such as points 204 and 210 in FIG. 2. After a region has been grown from the point (i.e., after a first iteration for growing the region), "X" represents the current region extent that has been grown by a previously performed number (1 or greater than 1) of iterations.

The 8 boxes surrounding the current region extent ("X") represents voxels that neighbor the current region extent. Although Table 1 above indicates that 8 neighboring voxels surround the current region extent ("X"), it is noted that there may be fewer than or more than 8 neighboring voxels surrounding the current region extent ("X").

Also, although Table 1 shows a two-dimensional (2D) growth of a region for ease of explanation, it is noted that the growth template can be extended into three dimensions to grow a region in three dimensions. A template for 3D growth is discussed further below.

In Table 1, four neighboring voxels are assigned the number "1," which indicates that those four neighboring voxels surrounding the current region extent are to be added when growing the region. Each of the four neighboring voxels assigned the number "1" is along a direction that extends to a vertex of a diamond with respect to the current region extent ("X"). More specifically, if edges connect the four neighboring voxels are assigned the number "1," these edges form a diamond. Thus, the four voxels assigned the number "1" are the vertices of a diamond.

The four neighboring boxes identified with "C" are conditionally included, based on a threshold that is used for determining whether a "C" neighboring voxel is to be added in the region that is being grown. For example, a random number (e.g., generated by a random number generator or a pseudorandom number generator) can be produced for each of the "C" neighboring voxels, and this random number can be compared to the threshold to determine whether or not the "C" neighboring voxel is to be added in the region that is being grown.

In some examples, the threshold is set equal to $1/(4\cdot\sqrt{2})$. By using the foregoing example threshold, a region being grown can approximately be shaped as a disc.

In other examples, a different threshold is used. If the random number for a "C" neighboring voxel is greater than (or has some other relationship with respect to) the threshold, then the "C" neighboring voxel is added to the region.

More generally, each "C" neighboring voxel is a voxel along a diagonal direction with respect to the current region extent ("X"). Such a neighboring voxel is added to the region being grown based on whether a value associated with the second neighboring voxel satisfies a voxel add criterion (e.g., the threshold discussed above).

In other examples, instead of growing discs, the regions that are grown can be in the shape of a diamond, a rectangle, and so forth.

Table 1 above grows a region in two dimensions, along a Z plane (e.g., a plane parallel to the external surface of the 3D object). The two dimensions along the Z plane can be referred to as the X and Y dimensions that lie in the Z plane.

For the region growth in three dimensions, the growth template includes Table 1 above, as well as the following two additional tables, Tables 2 and 3:

TABLE 2

| | | |
|---|---|---|
| 0 | C | 0 |
| C | 1 | C |
| 0 | C | 0 |

Table 2 represents region growth in the Z−1 plane, which is the plane including a layer of voxels below the layer of voxels in the Z plane. The "0," "1," and "C" values indicate growth in the same manner as for Table 1.

TABLE 3

| | | |
|---|---|---|
| 0 | C | 0 |
| C | 1 | C |
| 0 | C | 0 |

Table 3 represents region growth in the Z+1 plane, which is the plane including a layer of voxels above the layer of voxels in the Z plane. The "0," "1," and "C" values indicate growth in the same manner as for Table 1.

In other examples, other growth templates can be used.

Figure 4:
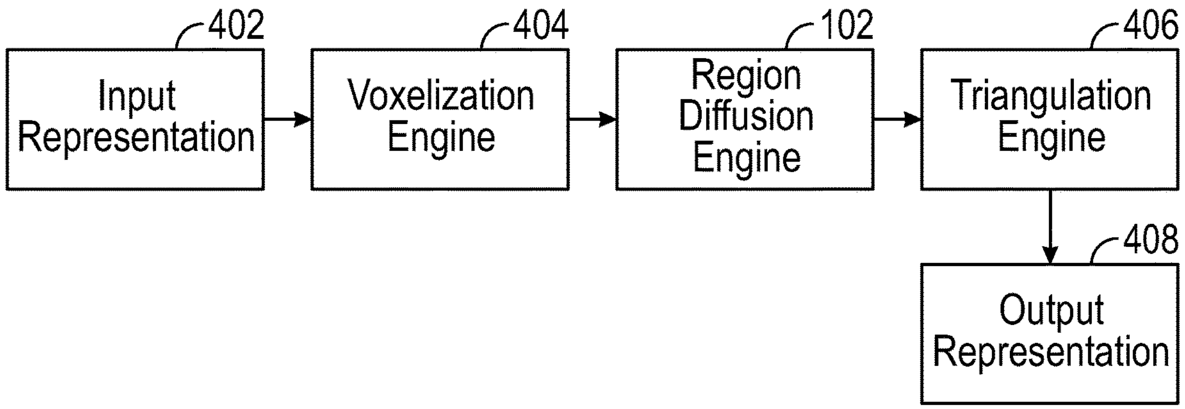
FIG. 4 is a block diagram of components for performing a digital representation conversion according to some examples.

FIG. 4 is a block diagram of example components involved in performing a digital representation conversion according to some examples of the present disclosure. An input representation 402 is received by a voxelization engine 404. The voxelization engine 404 applies voxelization on the input representation 402, which can be in the form of an input 3D mesh. The voxelization that is applied produces a volumetric bitmap, which is an arrangement of voxels. Examples of voxelizations that can be applied include a technique that is part of the Computational Geometry Algorithms Library (CGAL), which is an open source library of computational geometry techniques. One of the techniques that can be employed is a technique to voxelize a 3D mesh. Another type of voxelization that can be used is Mandoline voxelization, or another voxelization technique.

In other examples, instead of applying voxelization to an input representation, the input that is received by the digital representation conversion process can be in the form of voxel data, in which case the voxelization engine 404 can be omitted.

The voxelization bitmap including an arrangement of voxels is provided to the region diffusion engine 102, which applies the region diffusion engine 102 discussed above. The region diffusion engine 102 produces a pattern of points that is output to a triangulation engine 406. The triangulation engine 406 forms triangles based on the points, which produces an output representation 408 (e.g., an output 3D mesh that has more uniform triangles than the input 3D mesh).

Figure 5:
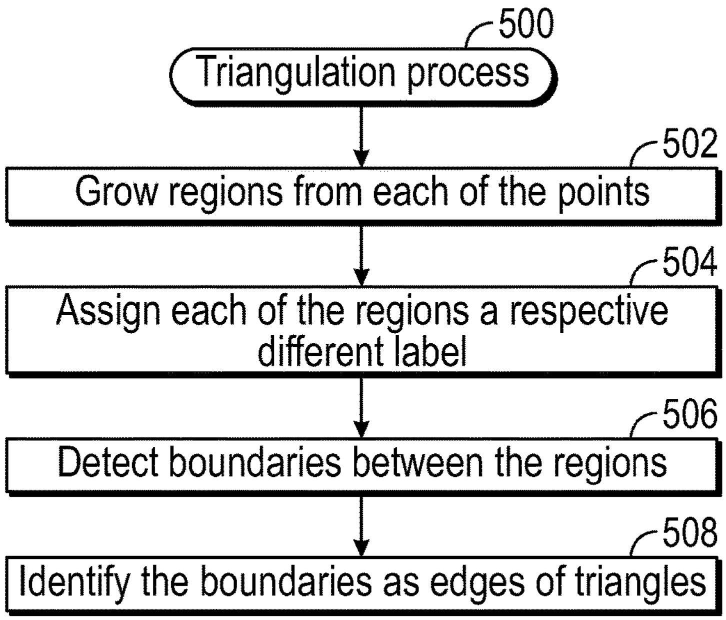
FIG. 5 is a flow diagram of a triangulation process according to some examples.

FIG. 5 is a flow diagram of a triangulation process 500 performed by the triangulation engine 406. From the points identified by the region diffusion engine 102, the triangulation process 500 grows (at 502) regions from each of the points (similar to the region growing performed by the region diffusion engine 102 using a growth template). Note that for the region growth performed in the region diffusion process 300, points are added to produce an output pattern of identified points. However, the region diffusion process 300 did not identify edges or subdivisions, and no triangulation was performed.

The triangulation process 500 assigns (at 504) each of the regions a respective different label. In some examples, neighboring regions that may contact each other are assigned different labels. A label may be reused for regions that would not contact each other when grown.

A "label" can refer to any identifier for the region. Labels can be in the form of numeric values, alphanumeric value, and so forth.

As the regions are grown, the boundaries of the regions contact each other. In some examples, the growing of the regions converges to a Voronoi diagram that is made up of Voronoi cells (which in examples of the present disclosure are the regions that are grown). The voxels in a region are associated with the same label that is assigned the region.

The triangulation process 500 detects (at 506) boundaries between the regions. Detecting the boundaries is based on edge detection that detects an edge between regions (and more specifically, respective subsets of voxels) having different labels.

The triangulation process 500 identifies (at 508) the boundaries as edges of triangles of the output 3D mesh. For a flat 2D plane and where regions that are grown are circles, the resulting Voronoi diagram has a triangular mesh representation. For the case where the external surface of the 3D object is not flat, for the surface voxels in 3D space, the resulting polygon mesh is almost entirely triangular. There can be degenerate cases, but these result in crossing edges that can be detected and eliminated as a post-processing task.

Figure 6:
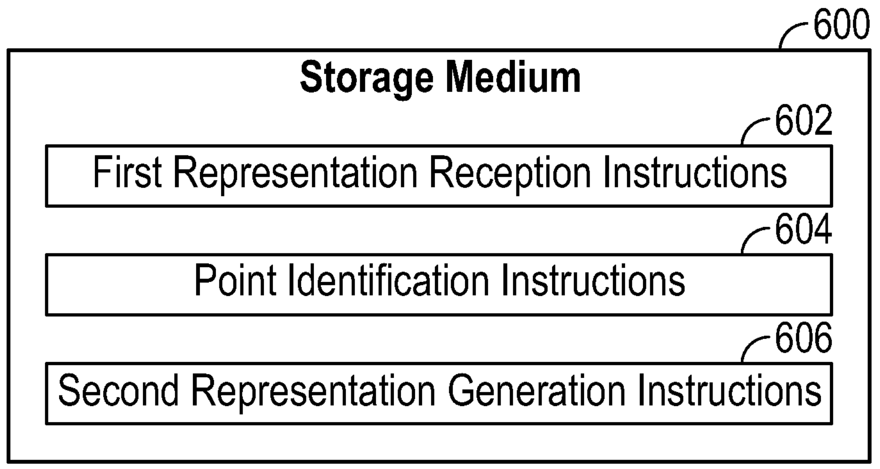
FIG. 6 is a block diagram of a storage medium storing machine-readable instructions according to some examples.

FIG. 6 is a block diagram of a non-transitory machine-readable storage medium 600 storing machine-readable instructions that upon execution cause a system to perform various tasks.

The machine-readable instructions include first representation reception instructions 602 to receive a first representation of a 3D object that has an external surface.

The machine-readable instructions include point identification instructions 604 to identify points on the external surface, where identifying a first point includes defining a region extending in a plurality of different directions from a second point across the external surface until a criterion is satisfied, where a location of the first point is based on a perimeter of the region.

In some examples, defining the region extending in the plurality of different directions from the second point includes growing the region based on adding, in a plurality of iterations, voxels to the region along the plurality of different directions from the second point.

In some examples, adding the voxels to the region in a given iteration of the plurality of iterations includes adding a first neighboring voxel to the region that is along a first direction (e.g., along a direction that extends to a vertex of a diamond) with respect to the region, and adding a second neighboring voxel that is along a second direction (e.g., a diagonal direction) to the region based on whether a value (e.g., a random value) associated with the second neighboring voxel satisfies a voxel add criterion (e.g., the threshold discussed further above).

The machine-readable instructions include second representation generation instructions 606 to generate, for image output (display of the 3D object or building of the 3D object), a second representation based on the identified points.

In some examples, the first representation includes a first 3D mesh of polygons representing the 3D object, and the second representation includes a second 3D mesh of polygons representing the 3D object. The polygons of the second 3D mesh are more isometric than the polygons of the first 3D mesh.

In some examples, the first representation of the 3D object includes an arrangement of voxels, such as in a volumetric bitmap.

In some examples, the machine-readable instructions can apply a transformation (e.g., bend, a displacement, etc.) of a portion of the second representation of the 3D object to produce a transformed second representation useable in an additive manufacturing machine in building the 3D object.

Figure 7:
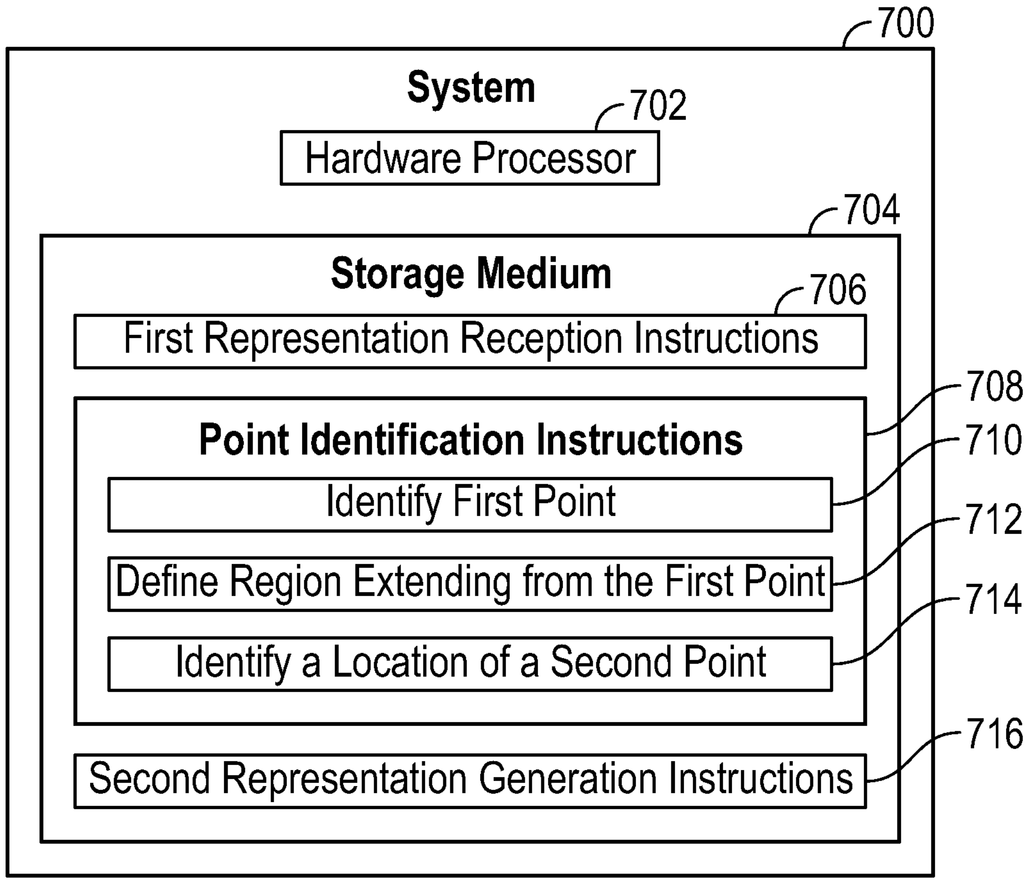
FIG. 7 is a block diagram of a system according to some examples.

FIG. 7 is a block diagram of a system 700 according to some examples, which can be a computer, an additive manufacturing machine, or any other processing system.

The system 700 includes a hardware processor 702 (or multiple hardware processors). A hardware processor can include a microprocessor, a core of a multi-core microprocessor, a microcontroller, a programmable integrated circuit, a programmable gate array, or another hardware processing circuit.

The system 700 further includes a storage medium 704 storing machine-readable instructions executable on the hardware processor 702 to perform various tasks. Machine-readable instructions executable on a hardware processor can refer to the machine-readable instructions executable on a single hardware processor or the instructions executable on multiple hardware processors.

The machine-readable instructions in the storage medium 704 include first representation reception instructions 706 to receive a first representation of a 3D object that has an external surface.

The machine-readable instructions in the storage medium 704 include point identification instructions 708 to identify points on the external surface, where the identifying includes identifying (710) a first point placed at a random location on the external surface, defining (712) a region extending in a plurality of different directions from the first point across the external surface until a criterion is satisfied, and identifying (714) a location of a second point on a perimeter of the region.

The machine-readable instructions in the storage medium 704 include second representation generation instructions 716 to generate, for image output, a second representation based on the identified points.

Figure 8:
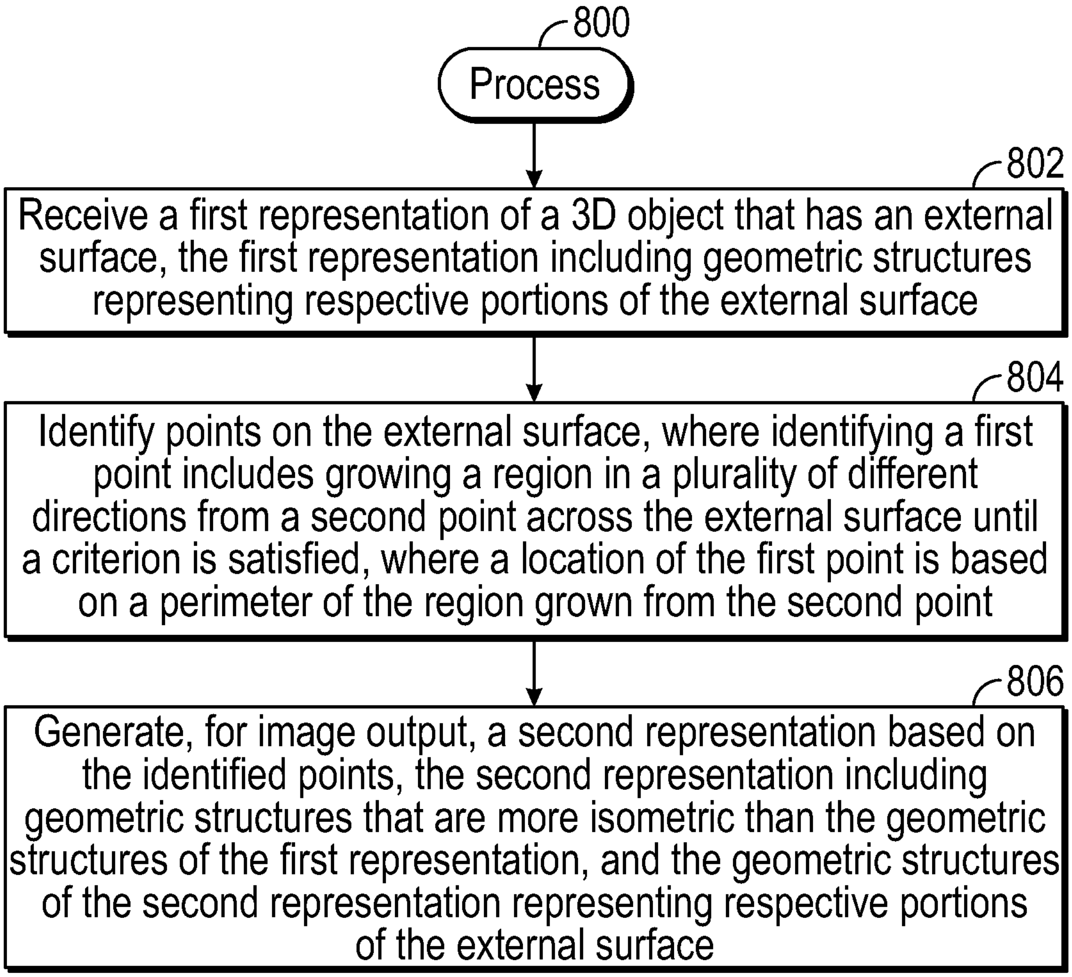
FIG. 8 is a flow diagram of a process according to some examples.

FIG. 8 is a flow diagram of a process 800 according to some examples. The process 800 can be performed by a system, such as the system 700 of FIG. 7.

The process 800 includes receiving (at 802) a first representation of a 3D object that has an external surface, the first representation including geometric structures (e.g., triangles or other polygons) representing respective portions of the external surface.

The process 800 includes identifying (at 804) points on the external surface, where identifying a first point includes growing a region in a plurality of different directions from a second point across the external surface until a criterion is satisfied, where a location of the first point is based on a perimeter of the region grown from the second point.

The process 800 includes generating (at 806), for image output, a second representation based on the identified points, the second representation including geometric structures that are more isometric than the geometric structures of the first representation, and the geometric structures of the second representation representing respective portions of the external surface.

By producing the second representation of the 3D object with geometric structures that are more isometric than the geometric structures of the first representation of the 3D object, deformation of the second representation can be more readily applied prior to image output of the 3D object (e.g., a deformation such as bending or displacement applied before building the 3D object by an additive manufacturing machine).

A storage medium (e.g., 600 in FIG. 6 or 704 in FIG. 7) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium storing instructions that when executed by a processor, cause the processor to perform processing comprising:

receiving a first representation of a three-dimensional (3D) object that has a surface, the first representation comprising a first 3D mesh of polygons representing respective portions of the surface of the 3D object;

identifying points on the respective portions of the surface of the 3D object, including a first point and a second point, by performing a process comprising growing a region extending in a plurality of different directions from the second point across the respective portions of the surface of the 3D object until a criterion is satisfied, wherein a location of the first point is based on a perimeter of the region grown from the second point; and generating a second representation based on the identified points, the second representation comprising a second 3D mesh of polygons, wherein the polygons of the second 3D mesh are more isometric than the polygons of the first 3D mesh, and the polygons of the second 3D mesh representing the respective portions of the surface of the 3D object.

2. The non-transitory machine-readable storage medium of claim 1, wherein the first representation comprises an arrangement of voxels.

3. The non-transitory machine-readable storage medium of claim 1, wherein growing the region extending in the plurality of different directions from the second point comprises growing the region based on adding, in a plurality of iterations, voxels to the region along the plurality of different directions from the second point.

4. The non-transitory machine-readable storage medium of claim 3, wherein adding the voxels to the region in a given iteration of the plurality of iterations comprises adding a first neighboring voxel to the region that is along a first direction with respect to the region, and adding a second neighboring voxel that is along a second direction to the region based on whether a value associated with the second neighboring voxel satisfies a voxel add criterion.

5. The non-transitory machine-readable storage medium of claim 4, wherein the value is a random value, and the voxel add criterion is a threshold to which the random value is compared.

6. The non-transitory machine-readable storage medium of claim 1, wherein growing the region comprises growing disc-shaped region.

7. The non-transitory machine-readable storage medium of claim 1, wherein generating the second representation based on the identified points comprises:

growing regions from the identified points; and detecting boundaries between the regions and identifying the boundaries as edges of the polygons of the second 3D mesh.

8. The non-transitory machine-readable storage medium of claim 7, wherein generating the second representation further comprises:

assigning labels to the regions, wherein detecting the boundaries between the regions is based on the labels.

9. The non-transitory machine-readable storage medium of claim 1, wherein the processing further comprises applying a transformation of a portion of the second representation to produce a transformed second representation useable in an additive manufacturing machine in building the 3D object.

10. The non-transitory machine-readable storage medium of claim 1, wherein the processing further comprises causing an additive manufacturing machine to build the 3D object based on the second representation.

11. The non-transitory machine-readable storage medium of claim 1, wherein the processing further comprises causing a display device to display the 3D object based on the second representation.

12. A system comprising:

a processor; and a non-transitory storage medium storing instructions executable on the processor to perform processing comprising:

receiving a first representation of a three-dimensional (3D) object that has a surface, the first representation comprising a first 3D mesh of polygons representing respective portions of the surface of the 3D object;

identifying points on the surface of the 3D object, including a first point and a second point, wherein the first point is identified by performing a process comprising growing a region extending in a plurality of different directions from the second point across the surface until a criterion is satisfied, wherein a location of the first point is based on a perimeter of the region grown from the second point; and generating a second representation based on the identified points, wherein the second representation comprises a second 3D mesh of polygons, wherein the polygons of the second 3D mesh are more isometric than the polygons of the first 3D mesh, and the polygons of the second 3D mesh representing the respective portions of the surface of the 3D object.

13. The system of claim 12, wherein the points further include a third point, and the process by which the points are identified further comprises:

growing a further region extending in the plurality of different directions from the second point across the surface until the criterion is satisfied, wherein a location of the third point is based on a perimeter of the further region.

14. The system of claim 12, wherein growing the region in the plurality of different directions from the second point is based on adding, in a plurality of iterations, voxels to the region along the plurality of different directions from the second point.

15. The system of claim 12, wherein the processing further comprises:

causing an additive manufacturing machine to build the 3D object based on the second representation; or causing a display device to display the 3D object based on the second representation.

16. A method, comprising:

receiving, by a hardware processor, a first representation of a three-dimensional (3D) object that has a surface, the first representation comprising a first 3D mesh of polygons representing respective portions of the surface of the 3D object;

identifying, by the hardware processor, points on the respective portions of the surface of the 3D object, including a first point and a second point, by performing a process comprising growing a region in a plurality of different directions from the second point across the respective portions of the surface of the 3D object until a criterion is satisfied, wherein a location of the first point is based on a perimeter of the region grown from the second point;

generating, by the hardware processor, a second representation based on the identified points, the second representation comprising a second 3D mesh of polygons, wherein the polygons of the second 3D mesh are more isometric than the polygons of the first 3D mesh, and the polygons of the second 3D mesh representing the respective portions of the surface of the 3D object; and causing an additive manufacturing machine to build the 3D object based on the second representation.

17. The method of claim 16, wherein the polygons of the first 3D mesh comprise first triangles of different sizes, and wherein the polygons of the second 3D mesh comprise second triangles having sizes that are more uniform than the different sizes of the first triangles of the first 3D mesh.

18. The method of claim 16, wherein growing the region in the plurality of different directions from the second point is based on adding, in a plurality of iterations, voxels to the region along the plurality of different directions from the second point.

19. The method of claim 18, wherein adding the voxels to the region in a given iteration of the plurality of iterations comprises adding a first neighboring voxel to the region that is along a first direction with respect to the region, and adding a second neighboring voxel that is along a second direction to the region based on whether a value associated with the second neighboring voxel satisfies a voxel add criterion.

20. The method of claim 16, wherein generating the second representation comprises:

detecting a boundary of the region as one or more an edge one of the polygons of the second 3D mesh; and assigning a label to the region.

* * * * *